(12) United States Patent
Zhang et al.

(10) Patent No.: US 9,041,815 B2
(45) Date of Patent: May 26, 2015

(54) DIGITAL CAMERA IMAGING EVALUATION MODULE

(75) Inventors: Hongqin Zhang, San Jose, CA (US); Shizhe Shen, San Jose, CA (US); Michael DiVincent, Discovery Bay, CA (US); Chong Yip Chow, Fremont, CA (US)

(73) Assignee: Apple Inc., Cupertino, CA (US)

( * ) Notice: Subject to any disclaimer, the term of this patent is extended or adjusted under 35 U.S.C. 154(b) by 499 days.

(21) Appl. No.: 13/014,086

(22) Filed: Jan. 26, 2011

(65) Prior Publication Data

US 2012/0086812 A1    Apr. 12, 2012

Related U.S. Application Data

(60) Provisional application No. 61/392,001, filed on Oct. 11, 2010.

(51) Int. Cl.
*H04N 17/00* (2006.01)
*H04N 17/02* (2006.01)
*H04N 5/253* (2006.01)

(52) U.S. Cl.
CPC ............. *H04N 17/002* (2013.01); *H04N 17/02* (2013.01)

(58) Field of Classification Search
USPC .......................................... 348/187, 92, 188
See application file for complete search history.

(56) References Cited

U.S. PATENT DOCUMENTS

| 6,115,492 | A  | * | 9/2000  | Meltzer et al. ............... 382/162 |
| 6,594,388 | B1 |   | 7/2003  | Gindele et al. |
| 6,606,116 | B1 | * | 8/2003  | Poynter ........................ 348/189 |
| 2010/0039539 | A1 |   | 2/2010  | Kinoshita |
| 2010/0329561 | A1 | * | 12/2010 | Sakai et al. ................... 382/173 |
| 2011/0075043 | A1 | * | 3/2011  | Chien et al. .................. 348/671 |

FOREIGN PATENT DOCUMENTS

EP    0 647 060    3/1999

OTHER PUBLICATIONS

"Color Uniformity Methodolgy described by : Larry Scarff, Vista Point Technologies" International Imaging Industry Association, Apr. 3, 2009.*

* cited by examiner

*Primary Examiner* — Jeffrey Harold
*Assistant Examiner* — Michael Teitelbaum
(74) *Attorney, Agent, or Firm* — Blakely, Sokoloff, Taylor & Zafman LLP

(57) ABSTRACT

An operator friendly camera testing module is described. The camera testing module includes at least a color shift evaluation unit and a color non-uniformity evaluation unit. The color shift evaluation unit providing a color shift metric and the color non-uniformity evaluation unit providing a color non-uniformity metric each used to characterize a digital camera.

32 Claims, 8 Drawing Sheets

DIGITAL CAMERA IMAGING EVALUATION MODULE

CROSS-REFERENCE TO RELATED APPLICATIONS

This application claims priority to each of U.S. Provisional Patent Application No. 61/392,001, filed Oct. 11, 2010, entitled "CAMERA TEST MODULE" by Zhang et. al. which is also incorporated by reference in its entirety.

TECHNICAL FIELD

The described embodiments relate generally quantatively determining color performance of a camera by measuring selected camera performance parameters.

DESCRIPTION OF THE RELATED ART

Color Shift refers to the amount of color tint away from neutral in a flat field image with an ideal uniform-gray exposure. Present day most digital cameras have a series of built in White Balance algorithms that correct for the color shift under various lighting conditions so white objects will appear white. This mimics human visual perception because the human eye is well adapted, in connection with our brains, to adjust color information it receives so that objects we know to be white appear white. However, unless the White Balance algorithm of a camera is customized for every specific condition, the color of the resulting image may be off to one degree of another.

Color Non-uniformity refers to the spatial color variations within a flat field image with an ideal uniform exposure. Several factors can introduce color variations within the same image, such as a mismatch between the CMOS micro-lens optical acceptance angle and the lens's chief ray angle across the field of view, inherent spectral sensitivity differences across the array, etc. Some advanced image processing techniques may reduce or compensate certain consistent, systematic variations, but there may be some residual color variations that still remain.

Resource efficient techniques for determining color properties of digital images received from a camera are desired.

SUMMARY OF THE DESCRIBED EMBODIMENTS

A camera performance evaluation system includes at least an image conditioner unit arranged to receive a target image and condition the target image. In one embodiment, the conditioned target image includes a plurality of regions of interest (ROI) each of which comprises a plurality of pixels located in proximity to and associated with each other where the total number of pixels corresponding to the plurality ROIs is less than a total number of pixels that form the target image. A color non-uniformity evaluation module in communication with the image conditioner unit is arranged to receive at least a portion of the conditioned target image and quantitatively measure camera color non-uniformity by determining a maximum color difference between any two of the plurality of ROIs and identifying the maximum color difference as a color non-uniformity metric of the camera. The camera performance evaluation system also includes a color shift evaluation module in communication with the image conditioner unit arranged to receive at least a portion of the conditioned target image and quantitatively measure camera color shift by calculating a color coefficient for each of the plurality of ROIs, determining a maximum color coefficient, and identifying the maximum color coefficient as a color shift metric of the camera.

In one embodiment, the camera performance evaluation system reports the color shift metric and the color non-uniformity metric.

A method for evaluating a performance of a digital camera can be carried out by performing at least the following: receiving a target image from the camera being evaluated by an image conditioner unit, conditioning the received target image by the image conditioner unit to include a plurality of regions of interest (ROI) each of which comprises a plurality of pixels located in proximity to and associated with each other. In the described embodiment, the total number of pixels corresponding to the plurality ROIs is less than a total number of pixels that form the target image. Additional operations include receiving at least a portion of the conditioned target image at a color non-uniformity evaluation module in communication with the image conditioner unit, the color non-uniformity evaluation module arranged to quantitatively measure camera color non-uniformity by determining a maximum color difference between any two of the plurality of ROIs and identifying the maximum color difference as a color non-uniformity metric of the camera. The portion of the conditioned target image is also received at a color shift evaluation module in communication with the image conditioner unit, the color shift evaluation module arranged to quantitatively measure camera color shift by calculating a color coefficient for each of the plurality of ROIs, determining a maximum color coefficient, and identifying the maximum color coefficient as a color shift metric of the camera, and reporting the color shift metric and the color non-uniformity metric for the camera being evaluated.

In one embodiment, non-transitory computer readable medium for storing computer code executed by a processor for evaluating a digital camera performance is described. The non-transitory computer readable medium including at least computer code for receiving a target image from the camera being evaluated by an image conditioner unit, computer code for conditioning the received target image by the image conditioner unit to include a plurality of regions of interest (ROI) each of which comprises a plurality of pixels located in proximity to and associated with each other. In one embodiment, the total number of pixels corresponding to the plurality ROIs is less than a total number of pixels that form the target image. The computer readable medium also includes computer code for receiving at least a portion of the conditioned target image at a color non-uniformity evaluation module in communication with the image conditioner unit, the color non-uniformity evaluation module arranged to quantitatively measure camera color non-uniformity by determining a maximum color difference between any two of the plurality of ROIs and identifying the maximum color difference as a color non-uniformity metric of the camera, computer code for receiving at least the portion of the conditioned target image at a color shift evaluation module in communication with the image conditioner unit, the color shift evaluation module arranged to quantitatively measure camera color shift by calculating a color coefficient for each of the plurality of ROIs, determining a maximum color coefficient, and identifying the maximum color coefficient as a color shift metric of the camera, and computer code for reporting the color shift metric and the color non-uniformity metric for the camera being evaluated.

In one aspect, the color non-uniformity can be measured using a color checker scene.

Other apparatuses, methods, features and advantages of the described embodiments will be or will become apparent to one with skill in the art upon examination of the following figures and detailed description. It is target that all such additional apparatuses, methods, features and advantages be included within this description be within the scope of and protected by the accompanying claims.

BRIEF DESCRIPTION OF THE DRAWINGS

The described embodiments and the advantages thereof can best be understood by reference to the following description taken in conjunction with the accompanying drawings.

Figure 1:
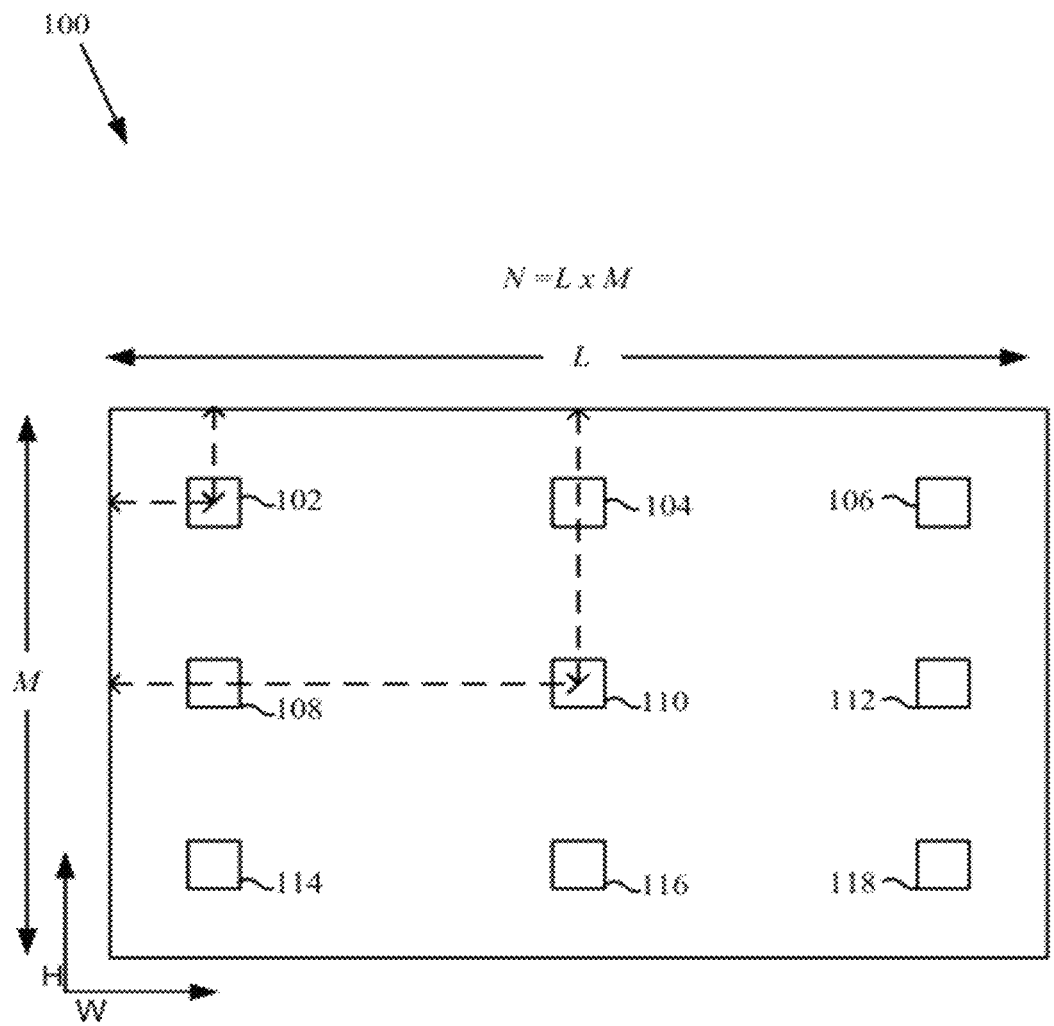
FIG. 1 shows conditioned target image in accordance with one embodiment.

DETAILED DESCRIPTION OF
REPRESENTATIVE EMBODIMENTS

In the following detailed description, numerous specific details are set forth to provide a thorough understanding of the concepts underlying the described embodiments. It will be apparent, however, to one skilled in the art that the described embodiments can be practiced without some or all of these specific details. In other instances, well known process steps have not been described in detail in order to avoid unnecessarily obscuring the underlying concepts.

Aspects of the described embodiments relate to a camera assembly. In particular an operator friendly methodology is provided for quantatively measuring selected performance characteristics of the camera. For example, a plurality of camera performance parameters can be performed using camera test modules each arranged to measure corresponding camera performance. For example, color shift and color non-uniformity of a digital image provided by a digital camera be determined. Color shift refers to the amount of color tint away from neutral in a flat field image with an ideal uniform-gray exposure. Color non-uniformity refers to the spatial color variations within a flat field image with an ideal uniform exposure.

Referring first to color shift, currently most digital cameras have a series of built in white balance algorithms that correct for the color shift under various lighting conditions so white objects will appear white. This mimics human visual perception because the human eye is well adapted, in connection with our brains, to adjust color information it receives so that objects we know to be white appear white. However, unless the white balance algorithm of a camera is customized for every specific condition, the color of the resulting image may be off to one degree of another. In a particular implementation the color shift can be measured in a manner that is requires substantially less time and computational resources than conventional approaches.

In one embodiment, selected pixels of a flat field image provided by a camera in a first color space can be selected to form an associated group of pixels, also referred to as a region of interest, or ROI. Accordingly, the flat field image can be divided into a number of ROIs. In one embodiment, the total number of pixels included in the number of ROIs can be substantially less than a total number of pixels in the flat field image. In this way, only a sample of the flat field image is required to determine the color shift. Accordingly, the number of pixels included in each ROI can depend upon a size of the image. In this way, the amount of computational resources required to provide a color shift metric for the camera is substantially reduced over conventional approaches to determining the color shift metric of the camera. In one embodiment, each ROI can include about the same number of pixels as each of the other ROIs. In one embodiment, the plurality of ROIs can be distributed in a substantially fixed pattern where each of the ROIs can be spaced a fixed distance apart from each other in an x direction and a fixed difference apart from each other in a y direction.

In one embodiment, when the first color space is RGB color space, the RGB pixel values can be transformed into a second color space, such as CIELAB. In one embodiment, the pixel values for each pixel in each ROI can be processed to provide an average pixel value for each ROI using CIELAB coordinates, for example. In one embodiment, using the CIELAB color values for each ROI, a color attribute can be calculated for each ROI. It should be noted that in some embodiments, a color appearance model, such as CIECAM02, can be used. It should be noted, however, that although CIECAM02 is pyscho-visually more accurate, use of CIECAM02 requires a substantial increase in computational resources due to the more complex calculations. In any case, regardless of the color space relied upon, CIELAB or CIECAM02, the color attribute for each ROI can represent a color shift. In one embodiment, a maximum color attribute value can represent the color shift metric for the camera.

In addition to color shift, a color non-uniformity metric for the camera can also be determined. Color non-uniformity refers to the spatial color variations within a flat field image with an ideal uniform exposure. Several factors can introduce color variations within the same image, such as a mismatch between the CMOS micro-lens optical acceptance angle and the lens's chief ray angle across the field of view, inherent spectral sensitivity differences across the array, etc. Some advanced image processing techniques may reduce or compensate certain consistent, systematic variations, but there may be some residual color variations that still remain.

In one embodiment, the ROIs used to determine color non-uniformity metric of the camera can be used to determine the color shift metric of the camera. While still using CIELAB color space, the color shift metric of the camera can be determined by calculating a color difference value between any two of the ROIs. A maximum ROI color difference value can be used to represent the color non-uniformity metric of the camera.

In this way, both the color shift metric and the color non-uniformity metric of the camera can be determined using a reduced set of pixels. The reduced set of pixels can then require a commensurably reduced set of calculations required to determine the color shift metric and the color non-uniformity of the camera. The reduced set of calculations, in turn, requires less computational resources. In addition, little or no operator knowledge is required and as a result, set up and test time can be substantially reduced These and other embodiments are discussed below with reference to FIGS. 1-8. However, those skilled in the art will readily appreciate that the detailed description given herein with respect to these figures is for explanatory purposes as the invention extends beyond these limited embodiments.

FIG. 1 shows target image 100 in accordance with the described embodiments. Target image 100 can be described in terms of an aspect ratio where the aspect ratio of image 100 can be represented s the ratio of width W to height H as aspect ratio W:H. Image 100 can also be described in terms of a total number of display elements, or pixel. As shown in FIG. 1, image 100 has a total of about N pixels arranged in a rectangular array having height H of M pixels and width W of L pixels where N=L×M. In this way, target image 100 can be described as being M pixels high by L pixels wide corresponding to a pixel resolution of L:M (for example as 640 by 480). Another popular convention is to cite resolution of image 100 as the total number of pixels in image 100 which in this simply the number of pixels N. In one embodiment, the resolution can be referred to in terms of megapixels which can be calculated by multiplying pixel columns (L) by pixel rows (M) and dividing by one million. Other conventions include describing pixels per length unit or pixels per area unit, such as pixels per inch or per square inch.

In one embodiment, target image 100 can be processed in such a way that a number of adjacent pixels can be associated with each other to form region R. For example, target image 100 can be processed to include regions R102 through R118 for a total of nine regions where each region R is about the same size and including about the same number of pixels. Presuming that each pixel is about the same size and shape (i.e., each pixel is a square pixel or each pixel is a rectangular pixel), then each region R can be shaped to have (I, J) pixels per side. In other words, each region R can be shaped as a rectangular region having one side I pixels in length and another side J pixels in length. In this way, each region R can include approximately an equal number of pixels (I×J). For the remainder of this discussion, the regions R are assumed to be square regions (i.e., I=J), therefore, the display 100 can be processed to include a number s regions R, also referred to as regions of interest, or ROI. In the embodiment shown in FIG. 1, s=9.

In one embodiment, the total number of pixels associated with all of regions R is less than the total number of pixels in target image 100. For example, as shown in FIG. 1, when the number of regions s, the total number of pixels $R_{pixels}$ associated with the s regions R each having (I×J) pixels can be represented by Eq. (1):

$$R_{pixels} = s \times (I \times J) \quad \text{Eq. (1)}.$$

In the example shown in FIG. 1, the number of regions s is equal to nine (9). Accordingly, the total number of pixels $R_{pixels}$ associated with regions R is represented by Eq. (2) as:

$$R_{pixels} = 9 \times (I \times J) \quad \text{Eq. (2)}.$$

Accordingly, the total number of pixels $R_{pixels}$ associated with regions R can be substantially less than that total number of pixels N displayed in image 100. In this way, the total number of calculations performed can be substantially reduced over conventional approaches to characterizing performance metrics for a digital camera.

In one embodiment, regions R can be located in fixed spatial positions relative to each other. For example, regions R102 and R104 can be located distance $d_1$ (in terms of pixels) from each other whereas regions R102 and R108 can be located distance $d_2$ from each other again in terms of the number of pixels separation. In one embodiment, regions R can also be located in fixed positions relative to image 100. For example, region R102 can be located in image coordinate system (H,W) at coordinate (0.2 H, 0.2 W) indicating a coordinate position of a center pixel of region R102. As a further example, region R110 can be centrally located at coordinate (0.5 H, 0.5 W), and so forth. In one embodiment, regions of interest R can be symmetrically located throughout image 100. In one embodiment, regions of interest R can be concentrated in certain portions (such as central portion) of image 100. In one embodiment, some of regions of interest R can be located in a central portion of image 100 whereas a remaining number of regions R can be located in a peripheral portion of image 100.

For example, in a representative embodiment, Table 1 shows fixed positions for regions R represented in terms of image coordinate system (H,W), where parameter k can have a range of about 5% to about 40%. For example, with regards to FIG. 1, k is about 20%. It should also be noted that each region R can be defined in terms of image coordinate system (H,W). In this the size of regions R can be expressed in terms of height coordinate H and width coordinate W. For example, in one embodiment, each region R can have a size ranging from about 0.1 H×0.1 W to about 0.33 H×0.33 W.

TABLE 1

| ROI | W coordinate | H coordinate |
|---|---|---|
| R102 | kW | kH |
| R104 | .5W | kH |
| R106 | (1-k)W | kH |
| R108 | kW | .5H |
| R110 | .5W | .5H |
| R112 | (1-k)W | .5H |
| R114 | kW | (1-k)H |
| R116 | .5W | (1-k)H |
| R118 | (1-k)W | (1-k)H |

In one embodiment, image properties (such as luminance, chrominance) for each region R can be used to characterize the region R. In other words, each pixel has a corresponding pixel value (the form of which can depend upon the color space in which the pixel value is expressed). It may be advantageous in some instances to convert from one color space to another color space. For example, an image can be represented in Red, Green, Blue (RGB) color space which is well known for use with video processing in which a pixel value can be represented by a data word having, for example, 24 bits where each color component (R, G, B) is eight bits in length. However, in order to more easily characterize a particular image or image process, it can be advantageous to convert from one color system to another color system using well known transformations. For example, pixel values in RGB color space can be converted to YCrCb color space that instead of representing the pixel value in terms of color components red, green, and blue represents the pixel value is represented in terms of luminance (Y) and chrominance (Cb, Cr). Using YCbCr as an example, converting from RGB color space to YCrCb color space, each region R can be characterize by an average luminance value of all pixel in that regions. In other words, once the luminance value for each pixel in region Ri is calculated, an average value $Y_{reg}$ of all the luminance values of all the pixels in the region Ri can be calculated using Eq. (3a):

$$Y_{reg} = \sum_{i,j=1}^{I,J} Yn/(I \times J) \quad \text{Eq. (3a)}$$

In one embodiment, using a particular color space can be advantageous when attempting to characterize performance metrics of a camera system. For example, if the camera system being evaluated is set up to provide images in RGB color space, it may be advantageous from both a computational and characterization standpoint to convert pixel data from the RGB color space to another, more appropriate color space. Such color spaces can include, for example, CIELAB color space. CIELAB is a color space that describes all the colors visible to the human eye. The three coordinates of the CIELAB color space represent the lightness of the color (L*=0 yields black and L*=100 indicates diffuse white; specular white may be higher), its position between red/magenta and green (a*, negative values indicate green while positive values indicate magenta) and its position between yellow and blue (b*, negative values indicate blue and positive values indicate yellow). The asterisk (*) after L, a and b are part of the full name, since they represent L*, a* and b*, to distinguish them from Hunter's Lab color system, a and b, well known in the art of color space.

With regards to color difference between pixels, the non-linear relations for L*, a*, and b* are intended to mimic the nonlinear response of the eye. Furthermore, uniform changes of components in the L*a*b* color space aim to correspond to uniform changes in perceived color, so the relative perceptual differences between any two colors in L*a*b* can be approximated by treating each color as a point in a three dimensional space (with three components: L*, a*, b*) and taking the Euclidean distance between them.

Figure 2:
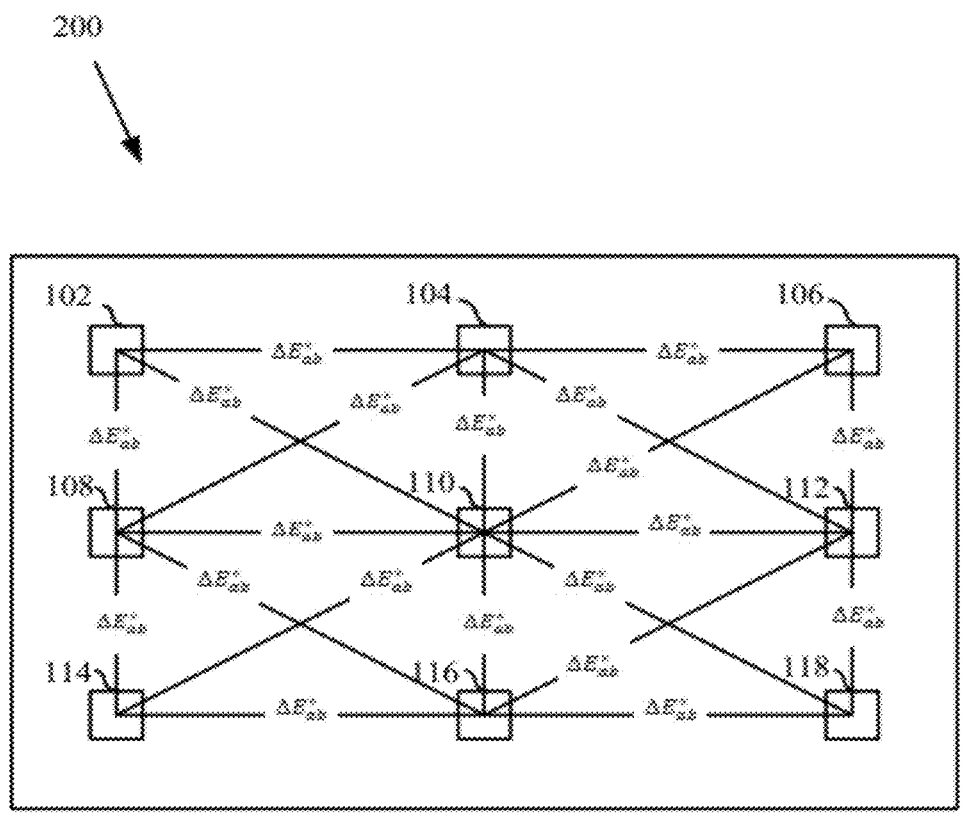
FIG. 2 shows color coefficient differencing between two regions of interest (ROI) in one embodiment.

For example, FIG. 2 shows representative color differences between any two regions R of image 100. As shown in FIG. 2, each region R can be characterized by using a single property, such as color, luminance, etc. For example, region R102 can be characterized by determining an average value of all the pixels within region R102 and assigning that average value as a characteristic value for region R102. Using CIELAB color space as an example, each pixel in a region R can be assigned a characteristic property such as a color attribute (a*,b*) and/or a luminance attribute (L*). Therefore, using Eq. (3a), and presuming lightness L* being the property of interest, each region R can be characterized in terms of a particular attribute C being an average value of lightness L* for all pixels within each region according to:

$$L = \sum_{i,j=1}^{I,J} Li,j/(I \times J) \quad \text{Eq. (3b)}$$

where C is the average lightness value for region R; and $L_{i,j}$ is a luminance value for each pixel in region R.

As discussed above, the color difference between any two regions of interest can be construed as the Euclidean distance between each region R (presuming each region R is characterized as the average property for all pixels in the region). In one embodiment, a color difference can be represented as distance metric $\Delta E_{ab}^-$ (where E stands for Empfindung; German for "sensation"). Using CIELAB color space, color distance $\Delta E_{ab}^-$ can be represented by Eq. (4). For example, using $C_1$ to represent a color associated with first region $R_1$ in CIELAB color space having components $(C_1^-, a_1^-, b_1^-)$ and $C_2$ (also in CIELAB color space) as a color associated with second region $R_2$ having color components $(C_2^-, a_1^-, b_2^-)$, the color difference between first region $R_1$ and second region $R_2$ can be represented in CIELAB color space as:

$$\Delta E_{ab}^- = \sqrt{\Box}(C_2^- - C_1^-)^2 + (a_2^- - a_1^-) + (b_2^- - b_1^-) \quad \text{Eq (4)}$$

In this way, using Eq. (4), color differences between each of regions R can be calculated and compared using relatively few computing resources. The color difference values can therefore provide an indication of color non-uniformity of image 100 and as such can be used to develop a color non-uniformity metric that can, in turn, provide simple yet powerful digital camera performance metric.

Furthermore using Eq. (5) to provide color attribute $C_{ab}^-$, an indication of color shift can be determined.

$$C_{ab}^- = \sqrt{\Box}((a^{-2} + b^{-2}) \quad \text{Eq. (5)}$$

Figure 3:
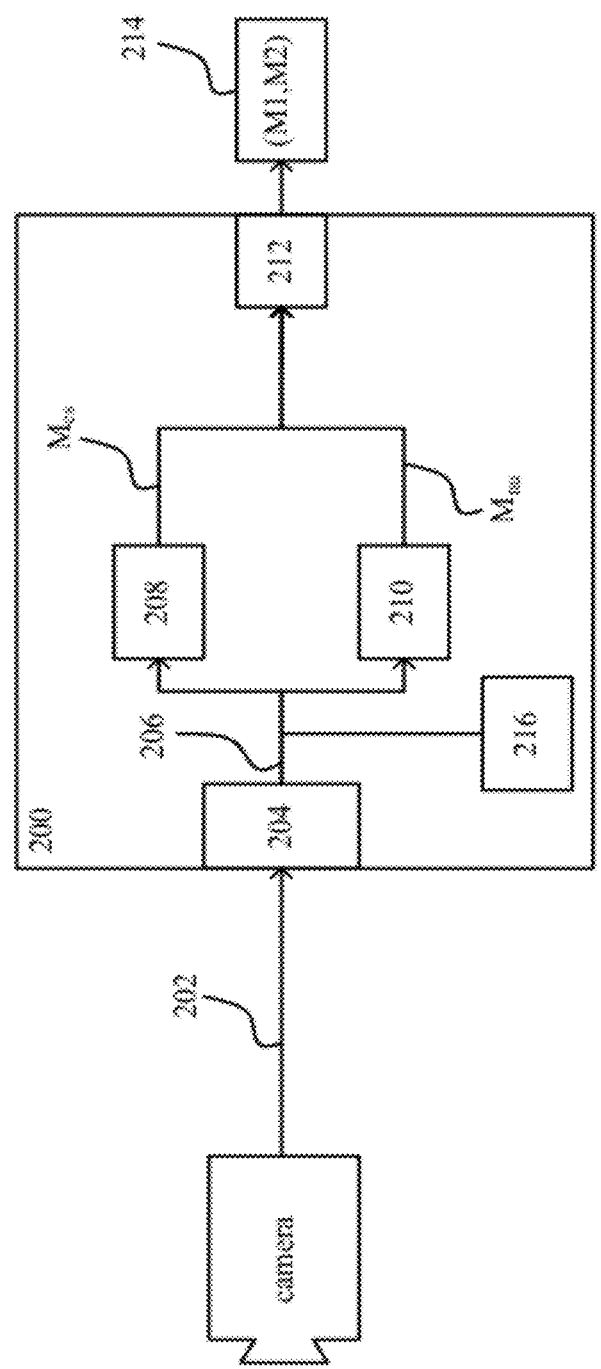
FIG. 3 shows a representative block diagram of a system for providing camera color performance metrics in one embodiment.

FIG. 3 shows representative camera evaluation system 200 in accordance with the described embodiments. Camera evaluation system 200 can be used to quickly and with minimum operator input analyze an image provided by a digital camera. The analysis of the image can in turn provide metrics that can be used to characterize the performance of the digital camera. Two such metrics can include color non-uniformity metric $M_{nu}$ and color shift metric $M_{cs}$. These metrics can be used to quickly and with little effort on part of a test operator, provide a reliable measure of the overall image capture and processing capability of the camera being evaluated.

As part of the analysis, camera evaluation system 200 can determine an amount of color shift and an amount of color non-uniformity associated with the camera being evaluated. In one embodiment, the amount of color shift associated with the camera can be represented as a color shift metric used to characterize the camera. In one embodiment, the color non-uniformity of the camera can be expressed as a color non-uniformity metric associated with the camera.

More specifically, camera evaluation system 200 can be arranged to receive test image 202 from the camera being evaluated. In one embodiment, test image 202 can be received directly from the camera being evaluated. In one embodiment, test image 202 can be received over a network when the camera being evaluated is remote from camera evaluation system 200. In one embodiment, test image 202 can actually be a number of images from one camera or a number of cameras, the test images being evaluated as a group or serially.

Test image 202 can be received at camera evaluation system 200 at image conditioner unit 204. Image conditioner unit 204 can identify a plurality of pixels each of which can then be associated as a region of interest, or ROI. As part of the image conditioning, image conditioner unit 204 can take into consideration the size of test image 202, the resolution (i.e., the number of pixels, pixel density, and so on) of test image 202, the aspect ratio of test image 202 and so on. In one embodiment, image conditioning unit 204 can provide conditioned image 206 to color shift evaluation unit 208 and color non-uniformity evaluation unit 210. In one embodiment, color shift evaluation unit 208 can perform a color shift evaluation process such as that shown in FIG. 4 described below. In one embodiment, color non-uniformity evaluation unit 210 can perform a color non-uniformity evaluation process such as that shown in FIG. 5 described further below. In one embodiment, color shift evaluation unit 208 can provide color shift metric $M_{cs}$ to output interface 212 and color non-uniformity evaluation unit 210 can provide color shift non-uniformity metric $M_{nu}$ to output interface 212. Output interface 212 can provide analysis report 214 that can be used to characterize the camera being evaluated. In one embodiment, color space converter 216 can be used to convert image data received at image conditioner unit in a first color space to a second color space. For example, RGB image data received at image conditioner unit 202 can be converted to CIELAB color space.

Figure 4:
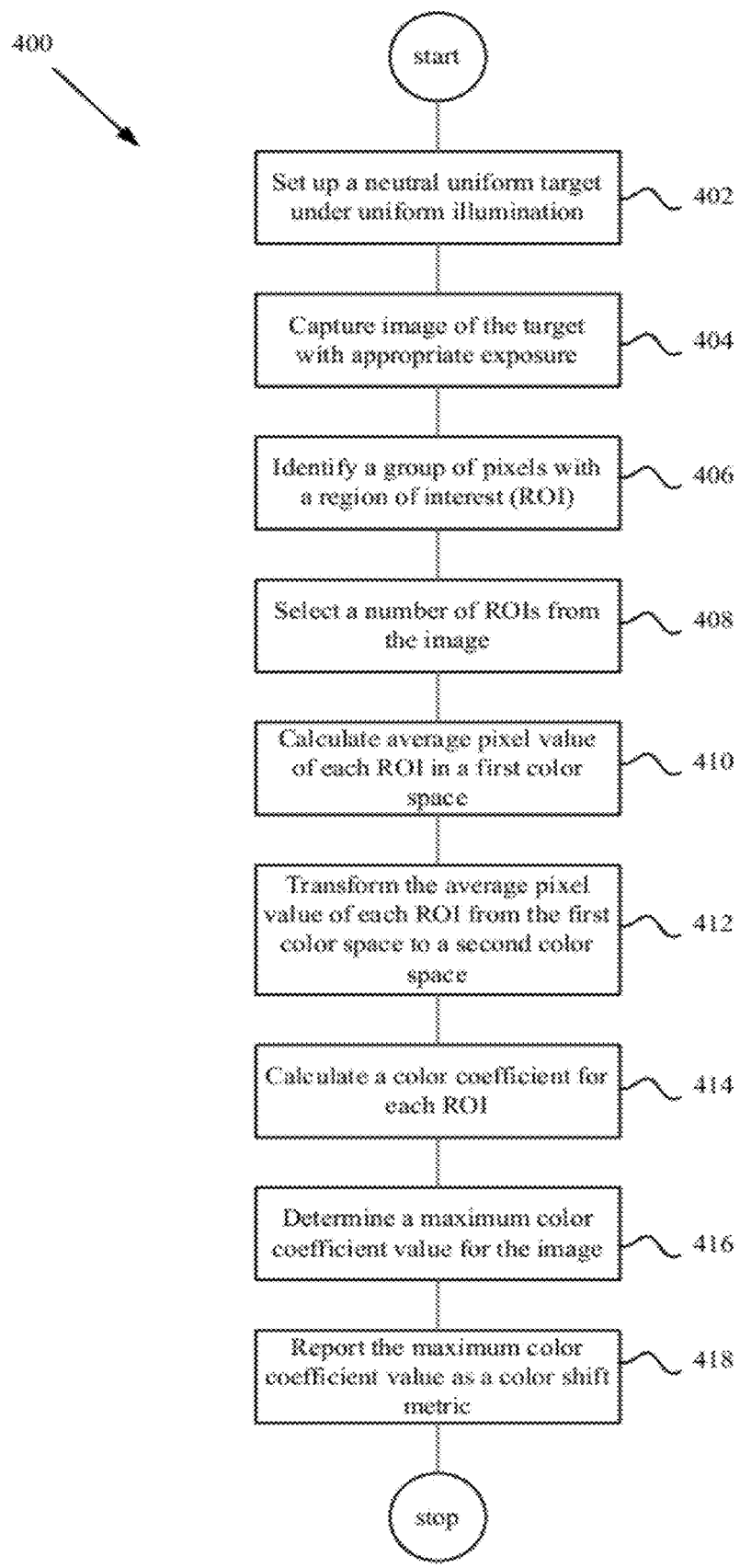
FIG. 4 is a flow chart illustrating a process for providing a color shift metric for a digital camera in accordance with one embodiment.

FIG. 4 is a flowchart describing process 400 for evaluating imaging performance of a digital camera in terms of color shift in accordance with a described embodiment. Process 400 can begin at 402 by providing neutral uniform target image under uniform illumination. In one embodiment, the uniform target image can include image 100 shown in FIG. 2. In one embodiment, at 404, a camera being evaluated captures the target image using an appropriate exposure setting. At 406, a group of pixels are identified as a region of interest in the target image. At 408, a number of regions of interest are distributed in the target image. In one embodiment, the total number of pixel associated with all of the regions of interest is substantially less than the total number of pixels in the target image. In one embodiment, the regions of interest are placed in the target image in a fixed positions relative to the target image. In one embodiment, the regions of interest can be placed more densely in those portions of the target image deemed most important. For example, a central portion of the test image can have more densely placed regions of interest than, for example, a peripheral region of the target image.

At 410, an average pixel value of each region of interest is calculated. In one embodiment the average pixel value can be transformed from a first color space to a second color space at 412. For example, when the first color space is RGB color space, the second color space can ben CIELAB, CIEDE2000, and so on. At 414, a color coefficient for each region of interest is calculated and at 416 a maximum color coefficient is then determined. At 418, the maximum color coefficient is provided in terms of a color shift metric.

Figure 5:
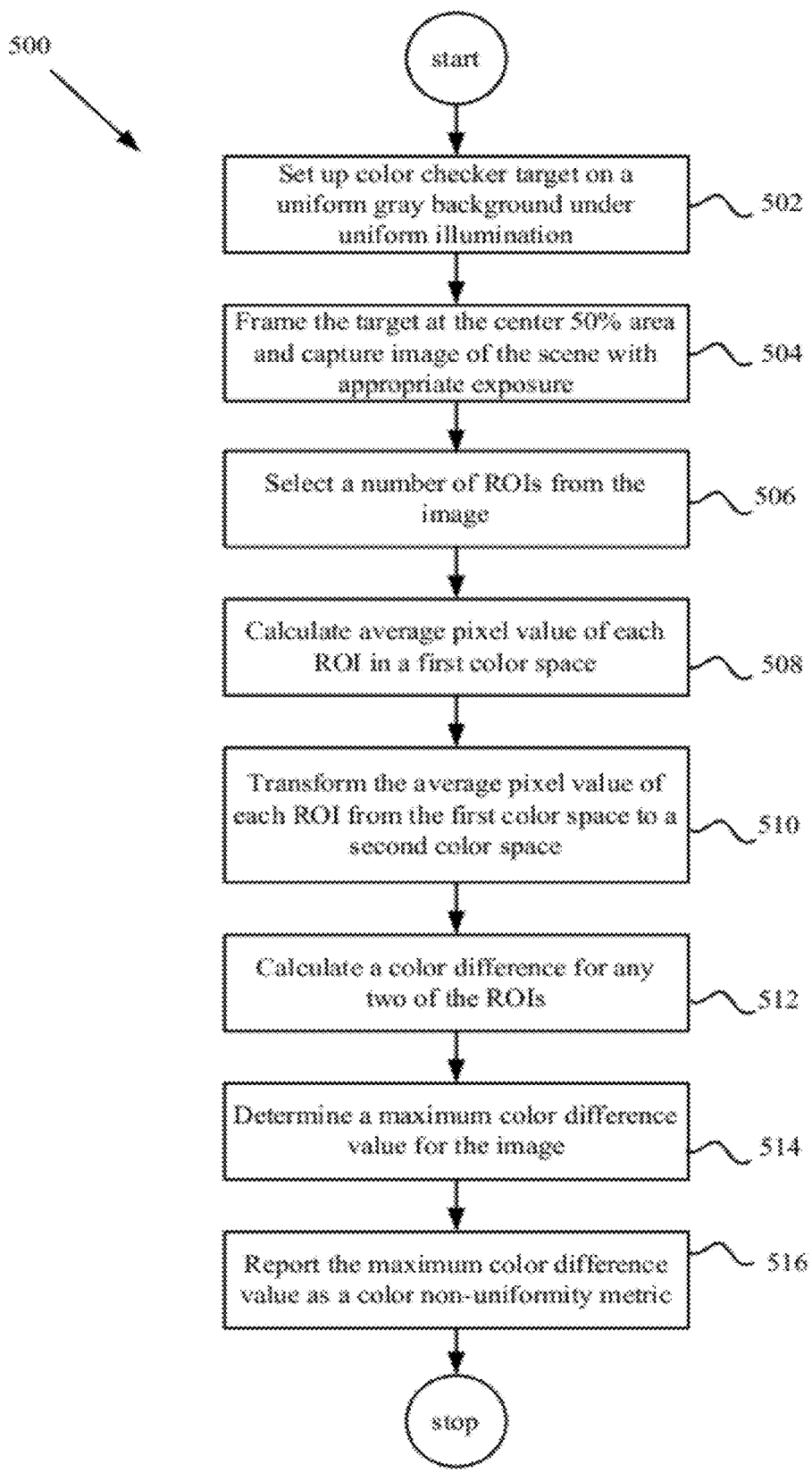
FIG. 5 is a flow chart illustrating a process for providing a color non-uniformity metric for a digital camera using a color checker.
Figure 6:
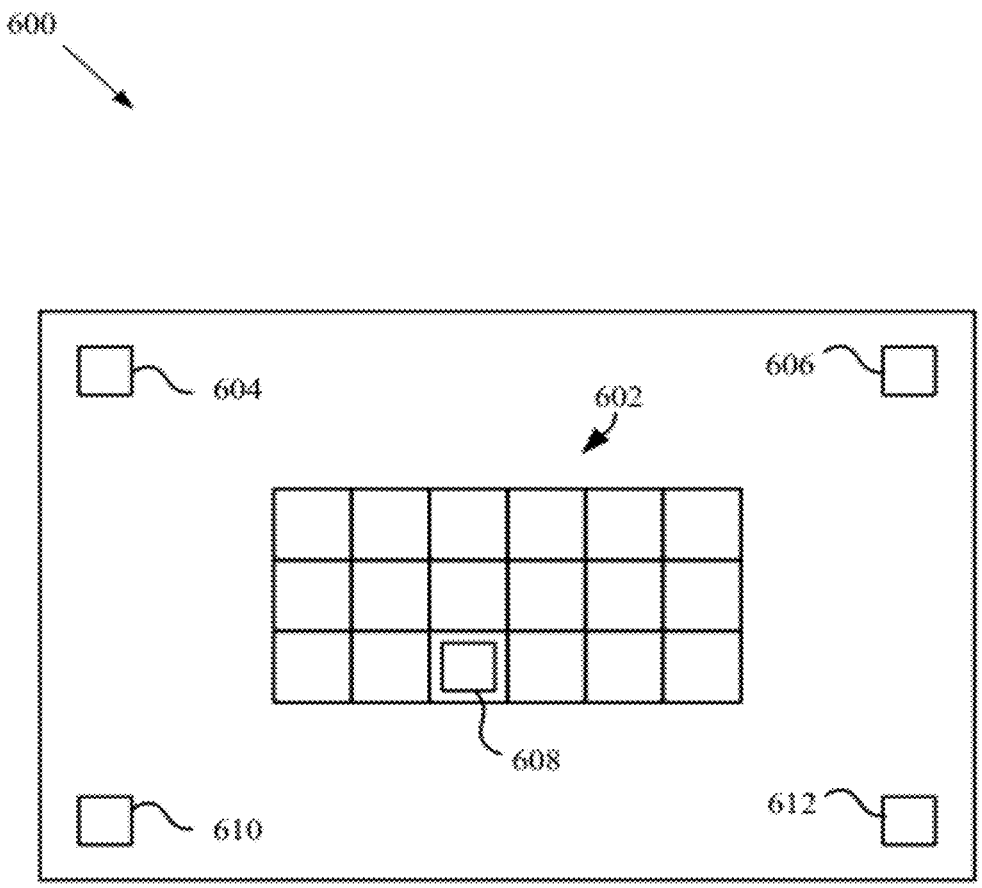
FIG. 6 shows representative color checker of FIG. 5.

FIG. 5 is a flowchart of describing process 500 in accordance with another embodiment. In particular process 500 describes a technique for quantatively measuring color non-uniformity with a color checker scene. More specifically, process 500 can be carried out by setting up a color checker target at 502. In a particular embodiment, the color checker can take the form of a MacBeth color checker. The target can be set up on a uniform gray background and illuminated with a uniform illuminator. At 504, the color checker target is framed so that it will be located at the center field of view (FOV) and occupy approximately 50% area of the FOV, and capture an image of the scene with appropriate exposure. At 506, a number of regions of interest (ROI) can be selected from the captured image at a number of corresponding locations. For example, as shown in FIG. 6 and described in more detail below, five (5) regions of interest can be selected. Next at 508, pixels within each region of interest are averaged and the RGB data is converted to an appropriate color space at 510. The color space can be, for example, CIELAB color space. At 512, the color difference between any two of the five regions of interest is calculated and at 514, the maximum color difference is determined and reported as a color non-uniformity metric at 514.

FIG. 6 shows a specific implementation of image 600 having color checker target 602 described with respect to FIG. 5 where five regions of interest (ROI) 604-612 are used to calculate the color non-uniformity of the image. In particular the selected ROIs can include ROI 604 can be located at top left corner on the surrounding gray area of image 600, ROI 606 can be located at top right corner on the surrounding gray area of image 600, ROI 608 can be located in a gray patch of color checker 602. In one embodiment the gray patch can be about 15-20% gray. Furthermore, ROI 610 can be located at a bottom left corner on the surrounding gray area of image 600 and finally ROI 612 can be located at a bottom right corner on the surrounding gray area of image 600. It should be noted that the size of each ROI can be appropriately defined based on the size of the gray patch in color checker 602.

Figure 7:
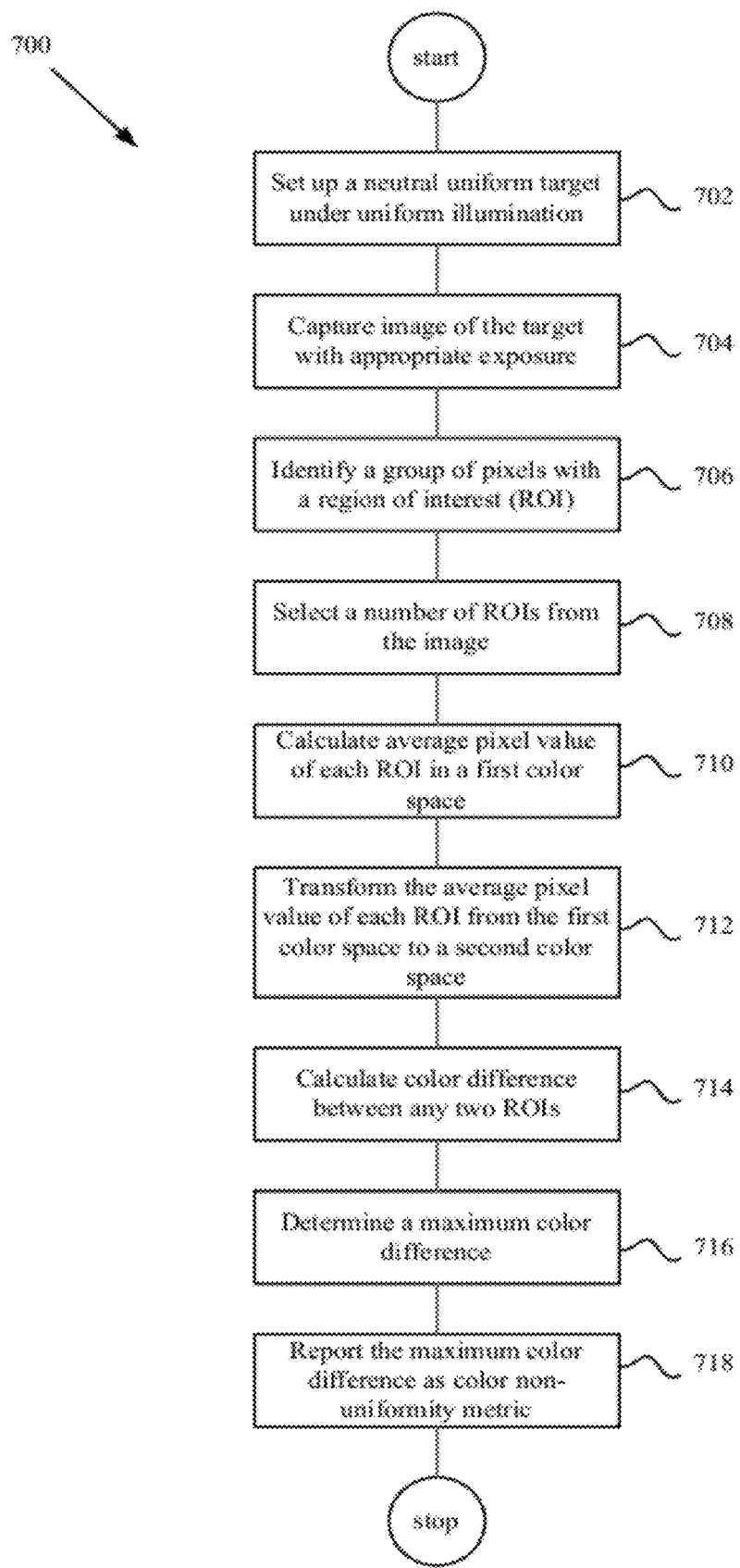
FIG. 7 is a flow chart illustrating a process for providing a color non-uniformity metric for a digital camera using a neutral uniform target image.

FIG. 7 is a flowchart describing process 700 for evaluating imaging performance of a digital camera in terms of color shift in accordance with a described embodiment. Process 700 can begin at 702 by providing neutral uniform target image under uniform illumination. In one embodiment, the uniform target image can include image 100 shown in FIG. 2. In one embodiment, at 704, a camera being evaluated captures the target image using an appropriate exposure setting. At 706, a group of pixels are identified as a region of interest in the target image. At 708, a number of regions of interest are distributed in the target image. In one embodiment, the total number of pixel associated with all of the regions of interest is substantially less than the total number of pixels in the target image. In one embodiment, the regions of interest are placed in the target image in a fixed positions relative to the target image. In one embodiment, the regions of interest can be placed more densely in those portions of the target image deemed most important. For example, a central portion of the test image can have more densely placed regions of interest than, for example, a peripheral region of the target image.

At 710, an average pixel value of each region of interest is calculated. In one embodiment the average pixel value can be transformed from a first color space to a second color space at 712. For example, when the first color space is RGB color space, the second color space can ben CIELAB, CIEDE2000, and so on. At 714, a color difference value is calculated between any two regions of interest and a 716 a maximum color difference value is determined. The maximum color difference value can then reported as a color non-uniformity metric at 718.

Figure 8:
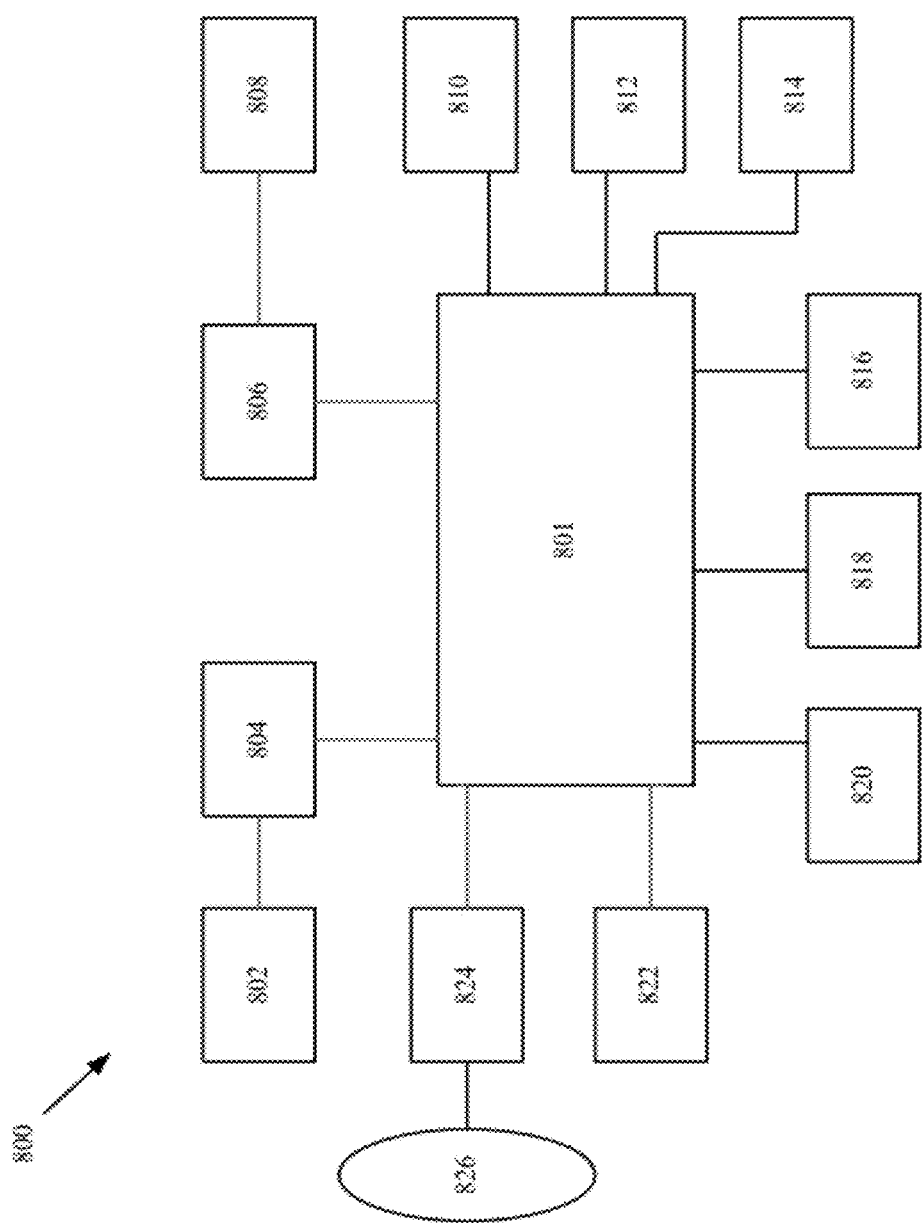
FIG. 8 shows a block diagram of a representative digital camera in accordance with the described embodiments.

Description will be made below regarding the components and the basic operation of the digital camera 800 according to the present embodiment with reference to a block diagram. FIG. 8 is a block diagram which shows the digital camera 800. In one embodiment, control unit 801 includes a CPU and so forth, which controls the overall system of the digital camera 800. The control unit 801 is connected to an image sensor 802, an image processing unit 804, a monitor control unit 806, a display unit 808, RAM 810, ROM 812, EEPROM 814, external memory 816, internal memory 818, an operation unit 820, an attitude sensor 822, a lens control unit 824, and so forth, and controls each of these components. The photographic optical system 826 is an optical system having a configuration including multiple lenses for forming an image of the subject on the image sensor 802. Furthermore, the photographic optical system 826 further includes a zoom optical system that allows the focal distance to be changed. The lens control unit 824 drives the zoom optical system so as to change the focal distance according to a control signal received from the control unit 801.

The image sensor 802 is a solid state image sensor such as a CCD, a CMOS, or the like, for converting the image of the subject formed by the photographic optical system 826 into an electric signal. The image sensor 802 also includes a driver or the like, which provides a function of readout control for an image signal and so forth, and a function of driving control for an electronic shutter and so forth. The image signal read out from the image sensor 802 is transmitted to the image processing unit 804. The image processing unit 804 performs various processing such as noise removal, A/D conversion, color interpolation, resizing, coding, and so forth, as necessary. The aforementioned storage image data is stored in the external memory 816 in the form of an image file along with the image capturing information at the moment of image capturing. On the other hand, the display image data is displayed on a back face monitor of the display unit 808 by the monitor control unit 806.

The term "image capturing information" as used here represents the image capturing information at the moment of image capturing, such as the shutter speed, the aperture value, date at which the image was captured, and so forth. The image capturing information is included in a file header in the form of EXIF information, for example. Note that the image file may be stored in the EEPROM 814, the internal memory 818, or the like.

Note that the image processing unit 804 also provides a function of reading out an image stored in the external memory 816 or the internal memory 818, and creating a display image which is to be displayed on the back face monitor. Also, the image processing unit 804 can perform various kinds of image processing for the image data stored in the external memory 816.

Examples of such image processing include: color conversion processing for converting a color component of the image data to another color component (for example, conversion of a color image into a monochrome image, color density adjustment, etc.); tone correction processing; edge enhancement processing; contrast adjustment processing; trimming processing for trimming a part of the image data area; resize processing for changing the resolution of the image data.

The RAM 810 is used as a temporary storage device for the data in a step in which the control unit 801, the image processing unit 804, or the like performs processing. The RAM 810 is a storage unit that to be used when creating a display image at the image processing unit 804. The ROM 812 stores a program necessary for the operation of the digital camera 800, the initial values used in the program, and so forth. The ROM 812 also stores various menu items to be displayed in a menu mode to be detailed later. The EEPROM 814 is a rewritable memory such as flash memory or the like, which has a function of holding the stored information after the power supply of the digital camera 800 has been turned off. The EEPROM 814 stores the information such as the user settings, the customized settings, etc., with respect to the digital camera 800. The external memory 816 is a detachable memory card for storing image files and so forth. The internal memory 818 is a storage medium for storing image files and so forth, examples of which include: a large-capacity magnetic disk such as a hard disk, etc.; a large-capacity optical disk such as a DVD etc.; and flash memory.

The digital camera 800 according to the present embodiment provides operation modes, i.e., a photographing or image capturing mode for performing an image capturing operation and processing for the image thus captured according to image capturing/processing settings set by the user, a menu mode which allows the user to set various kinds of settings while examining the menu screen displayed on the back face monitor, and an image display mode for displaying the storage image data thus captured or the like on the back face monitor. The operation control of the digital camera 800 for each of the image capturing mode, the menu mode, and the image display mode, is known processing, and accordingly, detailed description thereof will be omitted.

The foregoing description, for purposes of explanation, used specific nomenclature to provide a thorough understanding of the described embodiments. However, it will be apparent to one skilled in the art that the specific details are not required in order to practice the described embodiments.

Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A camera performance evaluation system, comprising:
an image conditioner unit arranged to receive a target image and condition the target image to create a conditioned target image, wherein the conditioned target image includes a plurality of regions of interest (ROI) each of which comprises a plurality of pixels located in proximity to and associated with each other, wherein a total number of pixels corresponding to the plurality ROIs is less than a total number of pixels that form the target image;
a color non-uniformity evaluation module in communication with the image conditioner unit arranged to receive at least a portion of the conditioned target image and quantitatively measure camera color non-uniformity by determining a maximum color difference between any two of the plurality of ROIs for all possible pairs of the ROIs and identifying the maximum color difference as a color non-uniformity metric of the camera;
a color shift evaluation module in communication with the image conditioner unit arranged to receive at least a portion of the conditioned target image and quantitatively measure camera color shift by calculating a color coefficient for each of the plurality of ROIs, finding a maximum color coefficient as the largest calculated color coefficient calculated for one of all the ROIs, and identifying the maximum color coefficient as a color shift metric of the camera; and
an output interface in communication with the color non-uniformity evaluation module and the color shift evaluation module, the output interface arranged to output a report indicating the color shift metric and the color non-uniformity metric of the camera.

2. The system as recited in claim 1, further comprising:
a color space converter unit, the color space converter unit arranged to receive pixel data in a first color space can convert the pixel data to a second color space.

3. The system as recited in claim 2, wherein the first color space is RGB color space and the second color space is CIELAB color space.

4. The system as recited in claim 3, wherein the color non-uniformity evaluation unit further conditions the target image to include a color checker target.

5. The system as recited in claim 4, wherein the color checker target is located within a central portion of the conditioned target image.

6. The system as recited in claim 4, wherein the color checker target is a MacBeth color checker.

7. A method for evaluating a performance of a digital camera, comprising:
receiving a target image from the digital camera at an image conditioner unit;
conditioning the received target image by the image conditioner unit to create a conditioned target image to include a plurality of regions of interest (ROI) each of which comprises a plurality of pixels located in proximity to and associated with each other, wherein a total number of pixels corresponding to the plurality ROIs is less than a total number of pixels that form the target image;

receiving at least a portion of the conditioned target image at a color non-uniformity evaluation module in communication with the image conditioner unit, the color non-uniformity evaluation module arranged to quantitatively measure camera color non-uniformity by determining a maximum color difference between any two of the plurality of ROIs for all possible pairs of the ROIs and identifying the maximum color difference as a color non-uniformity metric of the camera;

receiving at least the portion of the conditioned target image at a color shift evaluation module in communication with the image conditioner unit, the color shift evaluation module arranged to quantitatively measure camera color shift by calculating a color coefficient for each of the plurality of ROIs, finding a maximum color coefficient as the largest calculated color coefficient calculated for one of all the ROIs, and identifying the maximum color coefficient as a color shift metric of the camera; and reporting the color shift metric and the color non-uniformity metric for the camera being evaluated.

8. The method as recited in claim 7, further comprising:
wherein the reporting the color shift metric and the color non-uniformity metric for the camera being evaluated is carried out by an output interface in communication with the color non-uniformity evaluation module and the color shift evaluation module.

9. The method as recited in claim 8, further comprising:
converting a pixel data from a first color space to a second color space by a color space converter unit in communication with the image conditioner unit.

10. The method as recited in claim 9, wherein the first color space is RGB color space and the second color space is CIELAB color space.

11. The method as recited in claim 10, wherein the color non-uniformity evaluation unit further conditions the conditioned target image to include a color checker target.

12. The method as recited in claim 11, wherein the color checker target is located within a central portion of the conditioned target image.

13. The method as recited in claim 12, wherein the color checker target is a MacBeth color checker.

14. Non-transitory computer readable medium for storing computer code executed by a processor for evaluating a digital camera performance, comprising:
computer code for receiving a target image from the camera being evaluated by an image conditioner unit;
computer code for conditioning the received target image by the image conditioner unit to create a conditioned target image to include a plurality of regions of interest (ROI) each of which comprises a plurality of pixels located in proximity to and associated with each other, wherein a total number of pixels corresponding to the plurality ROIs is less than a total number of pixels that form the target image;
computer code for receiving at least a portion of the conditioned target image at a color non-uniformity evaluation module in communication with the image conditioner unit, the color non-uniformity evaluation module arranged to quantitatively measure camera color non-uniformity by determining a maximum color difference between any two of the plurality of ROIs for all possible pairs of the ROIs and identifying the maximum color difference as a color non-uniformity metric of the camera;
computer code for receiving at least the portion of the conditioned target image at a color shift evaluation module in communication with the image conditioner unit, the color shift evaluation module arranged to quantitatively measure camera color shift by calculating a color coefficient for each of the plurality of ROIs, finding a maximum color coefficient as the largest calculated color coefficient calculated for one of all the ROIs, and identifying the maximum color coefficient as a color shift metric of the camera; and
computer code for reporting the color shift metric and the color non-uniformity metric for the camera being evaluated.

15. The computer readable medium as recited in claim 14, further comprising:
wherein the computer code for reporting the color shift metric and the color non-uniformity metric for the camera being evaluated is executed by the processor in communication with an output interface in communication with the color non-uniformity evaluation module and the color shift evaluation module.

16. The computer readable medium as recited in claim 15, further comprising:
computer code for converting a pixel data from a first color space to a second color space by a color space converter unit in communication with the image conditioner unit.

17. The computer readable medium as recited in claim 16, wherein the first color space is RGB color space and the second color space is CIELAB color space.

18. The computer readable medium as recited in claim 17, wherein the color non-uniformity evaluation unit further conditions the conditioned target image to include a color checker target.

19. The computer readable medium as recited in claim 18, wherein the color checker target is located within a central portion of the conditioned target image.

20. The computer readable medium as recited in claim 19, wherein the color checker target is a MacBeth color checker.

21. The system of claim 1, wherein the image conditioner unit is arranged to receive the target image from a camera; the color non-uniformity evaluation module is to quantitatively measure camera color non-uniformity of the camera by identifying the maximum color difference as a greatest color difference determined to exist between any two of the plurality of ROIs; and the color shift evaluation module is to quantitatively measure camera color shift of the camera by determining the maximum color coefficient as a greatest color coefficient determined to exist for any of the plurality of ROIs.

22. The method of claim 7, wherein receiving the target image includes receiving the target image from a camera; quantitatively measuring camera color non-uniformity of the camera includes identifying the maximum color difference as a greatest color difference determined to exist between any two of the plurality of ROIs; and quantitatively measuring camera color shift of the camera includes determining the maximum color coefficient as a greatest color coefficient determined to exist for any of the plurality of ROIs.

23. The medium of claim 16, wherein receiving the target image includes receiving the target image from a camera; quantitatively measuring camera color non-uniformity of the camera includes identifying the maximum color difference as a greatest color difference determined to exist between any two of the plurality of ROIs; and quantitatively measuring camera color shift of the camera includes determining the maximum color coefficient as a greatest color coefficient determined to exist for any of the plurality of ROIs.

24. The system of claim 1, wherein the plurality of ROIs each have about the same size, about the same number of pixels, and about the same pixel colors; wherein the plurality of ROIs are symmetrically spaced in the conditioned target image; and wherein the same plurality of ROIs are used to identify the maximum color difference and to identify the maximum color coefficient.

25. The method of claim 7, wherein the plurality of ROIs each have about the same size, about the same number of pixels, and about the same pixel colors; wherein the plurality of ROIs are symmetrically spaced in the conditioned target image; and wherein the same plurality of ROIs are used to identify the maximum color difference and to identify the maximum color coefficient.

26. The medium of claim 16, wherein the plurality of ROIs each have about the same size, about the same number of pixels, and about the same pixel colors; wherein the plurality of ROIs are symmetrically spaced in the conditioned target image; and wherein the same plurality of ROIs are used to identify the maximum color difference and to identify the maximum color coefficient.

27. The system of claim 1, wherein the color non-uniformity evaluation module is arranged to quantitatively measure camera color non-uniformity in a CIELAB color space,
    wherein determining the maximum color difference includes treating each pixel as a point in three-dimensional space with respect to L*, a*, b* and taking the Euclidean distance between the average in the three-dimensional space of L*, a*, b* of the plurality of pixels of each of ROI, between any two of the plurality of ROIs for all possible pairs of the ROIs, and
    wherein the color shift evaluation module is arranged to quantitatively measure camera color shift in a CIELAB.

28. The system of claim 27, wherein the Euclidean distance between a first ROI and a second ROI is represented in CIELAB colors space by the square root of the difference between the average Luminance (L*) of the first ROI and the second ROI, plus the difference between the chrominance Cb (a*) of the first ROI and the second ROI, and plus the difference between the chrominance Cr (b*) of the first ROI and the second ROI.

29. The method of claim 7, wherein the color non-uniformity evaluation module is arranged to quantitatively measure camera color non-uniformity in a CIELAB color space,
    wherein determining the maximum color difference includes treating each pixel as a point in three-dimensional space with respect to L*, a*, b* and taking the Euclidean distance between the average in the three-dimensional space of L*, a*, b* of the plurality of pixels of each of ROI, between any two of the plurality of ROIs for all possible pairs of the ROIs, and
    wherein the color shift evaluation module is arranged to quantitatively measure camera color shift in a CIELAB.

30. The method of claim 29, wherein the Euclidean distance between a first ROI and a second ROI is represented in CIELAB colors space by the square root of the difference between the average Luminance (L*) of the first ROI and the second ROI, plus the difference between the chrominance Cb (a*) of the first ROI and the second ROI, and plus the difference between the chrominance Cr (b*) of the first ROI and the second ROI.

31. The medium of claim 14, wherein the color non-uniformity evaluation module is arranged to quantitatively measure camera color non-uniformity in a CIELAB color space,
    wherein determining the maximum color difference includes treating each pixel as a point in three-dimensional space with respect to L*, a*, b* and taking the Euclidean distance between the average in the three-dimensional space of L*, a*, b* of the plurality of pixels of each of ROI, between any two of the plurality of ROIs for all possible pairs of the ROIs, and
    wherein the color shift evaluation module is arranged to quantitatively measure camera color shift in a CIELAB.

32. The medium of claim 31, wherein the Euclidean distance between a first ROI and a second ROI is represented in CIELAB colors space by the square root of the difference between the average Luminance (L*) of the first ROI and the second ROI, plus the difference between the chrominance Cb (a*) of the first ROI and the second ROI, and plus the difference between the chrominance Cr (b*) of the first ROI and the second ROI.

* * * * *